United States Patent Office 3,349,062
Patented Oct. 24, 1967

3,349,062
HALOGENATED AROMATIC POLYAMIDES
Harold Wayne Hill, Bartlesville, Okla., and Stephanie Louise Kwolek and Wilfred Sweeny, Wilmington, Del., assignors to E. I. du Pont de Nemours and Company, Wilmington, Del., a corporation of Delaware
No Drawing. Filed July 21, 1966, Ser. No. 566,765
8 Claims. (Cl. 260—47)

This application is a continuation-in-part of our copending application S.N. 288,546, filed June 17, 1963, now abandoned, which in turn is a continuation-in-part of our copending application S.N. 774,156, filed Nov. 17, 1958, now Patent No. 3,094,511. This invention relates to novel polymers and to shaped structures prepared therefrom. More specifically it relates to high molecular weight aromatic polyamides having unusually high melting points.

Polyamides have found wide commercial acceptance, because they can be formed into strong abrasion-resistant fibers and films. As discussed in the aforementioned application, several desirable properties notably high temperature softening point and resistance to high temperature degradation had not been achieved in polyamides prior to our invention. For example, polyamides disclosed in U.S. 2,130,948 have relatively low melting points, and degrade rapidly in the presence of air at temperatures as low as 200° C. More important, they lose a substantial portion of their strength at temperatures much lower than their melting points. Polyamides disclosed in U.S. 2,244,192 show little tendency to crystallize to a dimensionally-stable structure, soften at temperatures considerably below their melting points and exhibit an undesirable amber color which renders them unsuitable for many purposes. Cold-drawn filaments prepared from these polyamides tend to retract or shrink at temperatures considerably below their melting points due, in part, to lack of crystallinity, and degrade rapidly at their melting temperatures. There had been a need for high molecular weight polyamides which are strong and stable at high temperatures and suitable for forming into filaments and films having water-white clarity. Polymetaphenylene isophthalamide of high molecular weight, disclosed in the aforementioned application along with several of its homologues, provided highly desirable properties, but these products are often so intractable that expensive procedures and materials are required to shape them into fibers and films.

In accordance with the present invention, there is provided a linear, fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

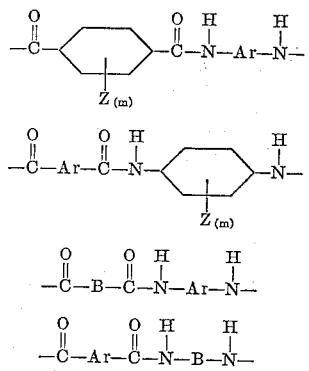

and

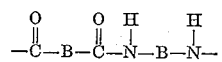

wherein:
Ar is a divalent radical from the class consisting of

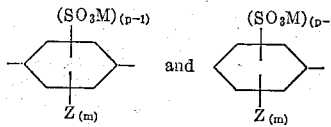

B is a divalent radical of the formula

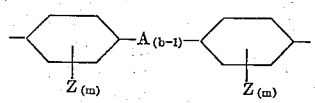

and wherein the hexagon represents the benzene nucleus, M is hydrogen or a neutralizing cation, Z is a monovalent radical replacement for hydrogen on nuclear carbon from the class consisting of —F, and —Cl,
$m$ is a number from 0 to 3, there being at least one $m$ equal to at least 1 in each recurring unit;
A is a divalent radical from the class consisting of —$SO_2$—, —$CH_2$—,

and —O—, $p$ is a number from one to two inclusive; and $b$ is a number of from one to two inclusive;

Other copolymeric units whenever present constituting no more than about 10% of the recurring polycarbonamide units, the said polycarbonamide having a melting point of at least about 300° C. and an inherent viscosity of at least about 0.6 in sulfuric acid at 30° C. at a concentration of 0.5 gram of polymer per 100 cc. of solution.

High molecular weight polymers of this invention are prepared by interfacial or solvent polymerization by reacting an aromatic diacid chloride with an aromatic diamine, the acid groups of the diacid chloride and the amine groups of the diamine being meta or para oriented relative to each other, at low temperatures (below 100° C.). These processes are described in detail in U.S. 2,831,834 to Magat (Apr. 22, 1958) and U.S. 3,063,966 to Kwolek, Morgan and Sorenson (Nov. 13, 1962).

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures, and are readily crystallizable.

The following examples illustrate the invention. All parts and percentages are by weight unless otherwise indicated. Unless otherwise indicated inherent viscosity reported in the examples is determined in sulfuric acid (Sp. Gr. 1.841 at 60° F.), at 30° C. at a concentration of 0.5 gram of polymer per 100 cc. of solution. All polymers of this invention are fiber-forming, i.e., they have an inherent viscosity of at least about 0.6 on this basis. They have a melting point of at least about 300° C.

*Example I*

Chloro-p-phenylenediamine (1.425 g.), which has been twice sublimed, is dissolved in 15 ml. of hexamethylphosphoramide in a small flask containing a magnetic stirrer. The solution is well cooled in ice water with stirring and 2.03 g. of solid, granular isophthaloyl chloride is added all at once. As the acid chloride dissolves, the solution becomes quite viscous. The mixture is stirred slowly in the flask, which is kept stoppered to exclude moisture, for a total time of 1 hour. It is then diluted with 15 ml. of acetone and the polymer is precipitated by pouring into 200 ml. of water while vigorously stirring in a blender. The polymer is repeatedly filtered and washed in a blender with water until free of solvent and hydrogen chloride. The fibrous polymer is then dried under vacuum at 80° C. for 10 hours. A yield of 100% of poly(chloro-p-phenylene isophthalamide) having an $\eta_{inh}$ of 0.90 and a polymer melt temperature above 400° C. is obtained.

*Example II*

The preparative procedure of Example I is followed employing 1.08 g. of chloro-p-phenylenediamine dihydrochloride which is dissolved in 20 ml. of slightly warmed hexamethylphosphoramide. The solution is then well cooled in ice water and 1.015 g. of terephthaloyl chloride is added. Heat is evolved. After 2 minutes the solution has appreciable body, but there is a further viscosity rise during the next 15 minutes. After 2 hours' stirring, 0.05 g. more TCl is added, which further increases viscosity. The mixture is diluted with a little dimethylacetamide and the product precipitates therefrom by pouring into water.

A slightly colored granular poly(chloro-p-phenylene terephthalamide) is obtained in 100% yield. The $\eta_{inh}$ is 0.94 and polymer melt temperature is above 400° C.

*Example III*

The preparative procedure of Example I is followed except that 1.77 g. of 2,6-dichloro-p-phenylene diamine is substituted for the chloro-p-phenylene diamine of that example. The product is poly(2,6-dichloro-p-phenylene isophthalamide). It is soluble in dimethylacetamide with addition of 5% LiCl.

*Example IV*

2,6-dichloro-p-phenylene diamine (1.77 grams) is dissolved in 15 ml. of hexamethylphosphoramide and the solution cooled in ice water. Terephthaloyl chloride (2.03 grams) is then added as a solid, and the mixture is stirred for about 30 minutes at room temperature. It is then poured into rapidly-stirred water, and the precipitated polymer is thoroughly washed in water and dried. The polymer has an inherent viscosity of 0.64 and melts at 383° C. Films are cast from dimethyl acetamide solutions.

*Example V*

The procedure of Example I is employed to prepare two additional polymers from 5-chloroisophthaloyl chloride and (A) 2,6-dichloro-p-phenylenediamine and (B) p-phenylenediamine. Data for these preparations and properties of polymers formed are given in the following table.

| Polymer | Diamine, g. | Acid Chloride, g. | $\eta_{inh}$ | Polymer Melt Tempt. |
|---|---|---|---|---|
| A | 1.77 | 2.38 | 0.68 | 320 |
| B | 1.08 | 2.38 | 0.72 | 345 |

*Example VI*

4-fluoro-m-phenylenediamine (1.26 g), obtained by the catalytic reduction of the corresponding dinitro compound, is dissolved in 15 ml. of pure hexamethylphosphoramide in a flask. The mixture is cooled to 5° C. and stirred while 2.03 g. of solid terephthaloyl chloride is added in portions during 10 min. The solution becomes somewhat viscous and the polymer is precipitated in water after 1 hour. The washed and dried polymer has an inherent viscosity of 0.79 and melts at 320° C.

*Example VII*

To a stirred solution of 32.20 g. of 2,5,2',5'-tetrachloro benzidine in 150 ml. of pure N-methylpyrrolidone, cooled to −10° C., is added during a 5 min. period 20.30 g. of liquid isophthaloylchloride. The resulting clear and viscous solution is stirred at 20–25° C. for 30 minutes, and at 40–45° C. for another 30 min. The polymer is precipitated in water, washed and dried. The product (44.6 g.) is white, has an inherent viscosity of 0.81 (in dimethylacetamide containing 4 wt. percent of lithium chloride) and does not melt below 400° C. Brilliantly clear, tough and flexible films are dry-cast from 20% solutions in dimethylformamide and dimethylacetamide. The films are highly flame-resistant and have remarkable hydrolytic stability; a film exposed for 3700 hours to boiling 10% sulfuric acid retains about half of its original strength.

*Example VIII*

The preparative procedure of Example VI is followed to prepare a polyamide from 2.00 g. of bis(4-aminophenyl) ether and 2.375 g. of 5-chloroisophthaloyl chloride.

The colorless product is isolated in 97% yield with an inherent viscosity of 1.1. It does not melt below 350° C. Clear strong films are dry-cast from solution in dimethylformamide.

*Example IX*

A mixture of 25.31 g. 3,3'-dichlorobenzidine and 10.81 g. m-phenylenediamine (equimolecular quantities) is dissolved in 350 ml. of pure N-methylpyrrolidone. The solution is cooled to 0° C. and stirred while 40.60 g. of liquid isophthaloylchloride is added over a period of 5 min., holding the reaction temperature below 20–25° C., and the clear, viscous solution is poured into rapidly stirred water. The 50/50 copolymer (99% yield) has an inherent viscosity of 1.60 (in dimethylacetamide containing 4% lithium chloride) and does not melt below 400° C. Films cast from a solution of the copolymer in dimethylacetamide with 4% lithium chloride, extracted with water and drawn to 400% of their as-cast length over a heated roll at 225° C. are clear, tough, and flame resistant. Such film strips typically have tenacity, elongation and modulus of 3.5 g.p.d., 14.5% and 60 g.p.d., respectively.

*Example X*

A solution of 81.11 g. m-phenylenediamine and 80.505 g. 2,5,2',5'-tetrachlorobenzidine (a 3/1 molecular ratio) in 1000 ml. pure dimethylacetamide is cooled to −10° C. Liquid isophthaloylchloride (203.02 g.) is added to the stirred solution while cooling is applied to hold the reaction temperature between 15–20° C. The reaction mixture is stirred for 15 min. at 20° C. and then diluted with dimethylacetamide to a volume of 2000 ml. The white 75/25 copolymer is isolated by precipitation in water. The yield is 99.7%, and the inherent viscosity (in dimethylacetamide containing 4% of lithium chloride) is 0.94. The copolymer does not melt below 320° C. Fibers dry-spun from 30% solution in dimethylacetamide are extracted and drawn to 450% of their as-spun length. The resulting white fibers have denier, tenacity, elongation and initial modulus of 4.3, 2.0 g.p.d., 45% and 44 g.p.d., respectively.

Example XI 3,3'-dichlorobenzidine (2.53 g.) is dissolved in 14 ml. of hexamethylphosphoramide. The solution is cooled with ice-water and stirred with a magnetic stirrer while 2.03 g. of isophthaloyl chloride is added. The solution remains clear and becomes very viscous. After fifteeen minutes some precipitate begins to form. After 1 hr. the solution is diluted with an equal volume of acetone and poured into rapidly stirred water. The white polymer has an inherent viscosity of 0.6 ($H_2SO_4$). It does not melt below 300° C.

Films cast from a solution of the polymer in dimethylacetamide with 5% (by wt.) of lithium chloride are especially flame resistant.

Example XII

The preparative procedure of Example XI is followed but with 18 ml. of hexamethylphosphoramide as the medium in which 2.53 g. of 3,3'-dichlorobenzidine is allowed to react with 2.95 g. of bis(4-chlorocarbonylphenyl) ether. After standing overnight, the polymer dispersion is diluted with acetone and the product is precipitated in water. The polymeric product (91% yield) has an inherent viscosity of 0.71. It does not melt below 380° C.

Example XIII

Bis(4-aminophenyl)methane (1.98 g.) and 2.22 ml. of N-methylmorpholine are dissolved in 50 ml. of 2,4-dimethyltetramethylene sulfone in a flask. The mixture is cooled and stirred while 2.375 g. of 4-chloroisophthaloyl chloride in 15 ml. of the same solvent is added over a period of 3 min. A portion of solvent (3 ml.) is used for a rinse. The mixture increases in viscosity and some turbidity develops. The polymer is isolated as a fibrous precipitate in water. The yield of dried polymer is 3.93 g. and the inherent viscosity is 0.6.

The polymer is readily soluble in dimethylformamide and tetrahydrofuran-water (90–10 by wt.). Clear, tough film was cast from solution in dimethylformamide.

4-chloroisophthaloyl chloride is prepared by potassium permanganate oxidation of 4-chloro-m-xylene, followed by treatment of the diacid with thionyl chloride.

Example XIV

In 1000 ml. of pure dimethylacetamide is dissolved 81.11 g. m-phenylenediamine and 63.28 g. 3,3'-dichlorobenzidine (3/1 molecular ratio). The solution is cooled to −10° C. and 203.02 g. isophthaloylchloride is added with rapid stirring and cooling. The clear, viscous solution is allowed to warm to 35° C. and stirred at this temperature for 15 min. After dilution with 700 ml. of dimethylacetamide the product is precipitated in water. The white copolymer, obtained in 99.5% yield, has an inherent viscosity of 1.80 (in dimethylacetamide containing 4% lithium chloride) and does not melt below 400° C. Clear, tough films are cast from a 20% solution of the copolymer in dimethylacetamide containing 4% of lithium chloride. Fibers are dry-spun from 17.5% solution of the copolymer in a mixture of 96 parts dimethylacetamide and 4 parts lithium chloride. After extraction-drawing in hot water to 430% of their as-spun length and hot-roll treatment at 350° C., the white fibers have denier, tenacity, elongation and initial modulus of 2.3, 3.2 g.p.d., 27% and 70 g.p.d., respectively.

Example XV

A solution of 25.31 g. 3,3'-dichlorobenzidine in 160 ml. of pure N-methylpyrrolidone is prepared and cooled to +15° C. To the rapidly stirred solution is added 20.30 g. of a liquid mixture consisting of 70% isophthaloylchloride and 30% terephthaloylchloride while maintaining the reaction temperature at 15° C. by cooling. After about three-fourths of the acid chloride mixture is added over the course of 5 minutes the mixture becomes very viscous and turns turbid. To facilitate stirring, a solution of 100 ml. N-methylpyrrolidone and 15 g. lithium chloride is added. The rest of acid chloride mixture is introduced, and the mixture is stirred at 50° C. for 20 minu. Fibrous polymer is isolated by precipitation in water. The yield of dried polymer is 100% and the inherent viscosity is 1.50 (in dimethylacetamide containing 4% lithium chloride). The copolymer does not melt below 400° C. Tough, clear films are made by dry-casting a 10% solution of the polymer in dimethylacetamide (with 5% lithium chloride), extraction of salt and solvent and drawing to 300% of their as-cast length at 300° C. and to 105% of their length at 400° C.

Example XVI

A mixture of 81.11 g. m-phenylenediamine and 63.28 g. 3,3'-dichlorobenzidine (3/1 molecular ratio) is dissolved in 1000 ml. of pure dimethylacetamide. The solution is cooled to −10° C. A liquid mixture of 142.11 g. isophthaloyl chloride and 60.91 g. terephthaloyl chloride (7/3 molecular ratio) is added over a 10 min. period with rapid stirring while the reaction temperature is held below 20° C. by cooling. Thereafter, the clear solution is warmed to 30° C. and stirred for 30 min. The mixture is diluted with 100 ml. dimethylacetamide and the polymer precipitated in water. Washed and dried copolymer is white and has an intrinsic viscosity of 1.76 (in dimethylacetamide containing 4% lithium chloride). The copolymer, obtained in 100% yield, does not melt below 320° C.

Example XVII

To a solution prepared from 240 g. m-phenylenediamine, 40 g. 2,5,2',5'-tetrachlorobenzidine, 31.6 g. dry sodium salt of 2,4-diaminobenzene sulfonic acid (0.889/0.050/0.061 molecular ratio) and 2800 ml. pure dimethylacetamide is added slowly with cooling and stirring 507.0 g. of liquid isophthaloyl chloride. After stirring for 1 hour, the mixture is neutralized with 194.5 g. lime. A sample of polymer isolated from the solution has as inherent viscosity of 1.47 (in dimethylacetamide containing 4% lithium chloride). The neutralized solution is used to dry-spin fiber which is extracted and drawn to 370% of its as-spun length and heated to 260° C. The fiber has denier, tenacity, elongation and initial modulus of 3.3, 3.6 g.p.d., 48% and 54 g.p.d., respectively, and can be dyed to a deep shade using an aqueous bath of C.I. Basic Blue 21 (2 hours, 20 p.s.i. pressure). Dye on fiber is 5.60% and the dye bath is 72.8% exhausted. The polymer does not melt below 320° C.

Among the starting materials suitable for preparing polymers of the present invention are included (A) diamines such as those of chloro-p-phenylene; 2,3-, 2,5- and 2,6-dichloro-p-phenylene; 2,3,5-trichloro-p-phenylene; 2-, 4- and 5-chloro-m-phenylene; 2,4-, 2,5-, 4,5- and 4,6-dichloro-m-phenylene; 2,4,5-, 4,5,6-, 2,4,6-trichloro-m-phenylene; 2,2'- and 3,3'-dichlorobenzidine, 2,2'-, 3,3'-tetrachlorobenzidine, similarly substituted bi-aryl diamines containing the following inter-aryl bivalent radicals:

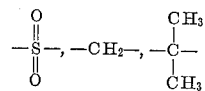

and —O—, the fluoro analogue of each and (B) diacid chlorides such as those of chloroterephthaloyl; 2,3-, 2,5- and 2,6-dichloroterephthaloyl; 2,3,5-trichloroterephthaloyl, 2-, 4-, and 5-chloroisophthaloyl, 2,4-, 2,5-, 4,5-, and 4,6-dichloroisophthaloyl; 2,4,5-, 4,5,6-, and 2,4,6-trichloroisophthaloyl, 2,2'- and 3,3'-dichloro,4,4'-bibenzoyl chloride 2,2'-, 3,3'-tetrachloro, 4,4'-bibenzoyl chloride similarly-substituted bi-aryl diacids containing the following inter-aryl bivalent radicals:

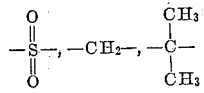

and —O—; and the fluoro analogue of each. As has been demonstrated, it is not necessary to the purposes of this invention that both diamine and diacid moieties be substituted. Thus diamines of the types outlined above but without aromatic ring substituents are satisfactorily coupled with substituted diacides of the types described, and unsubstituted diacids are satisfactorily coupled with substituted diamines. Copolymers of these reactants and those employed in the specific examples can be made in any proportion by mixture of appropriate diamines and/or acids. In addition, up to about 10% polymer-forming ingredients which may or may not contain an aromatic nucleus can be included without seriously detracting from the extraordinary physical and chemical properties of the polymers of this invention. Typical aliphatic copolymerizable starting materials include diamines such as ethylene diamine, tetraethylene diamine, hexamethylene diamine, decamethylene diamine, and the like and dibasic acids such as malonic, adipic, and sebacic. Preferably, however, the diamine and the diacid compounds untilized will be wholly aromatic, thus resulting in a polymer characterized entirely by structural units with all of the nuclei containing aromatic radicals. Typical aromatic copolymerizable starting materials include diamines such as m-phenylene diamine, p-phenylene diamine,, 2,6-dichloro-p-phenylene diamine, bis(4-aminophenyl) methane, 3,3'-dichlorobenzidine, p-xylylenediamine and the like and dibasic acyl halides such as isophthalic, terephthalic, bis(4-haloacylphenyl) sulfone, bis (4-haloacylphenyl) ether, bibenzoyl halide and the like. In addition alicyclic copolymerizable starting materials such as hexahydro-p-phenylene diamine and hexahydroterephthaloyl halide as well as heterocyclic materials such as piperazine and the like may be employed. The nature of the linking radical in the chain is not critical in the copolymeric component of the chain and may be other than carbonamide. For instance the linkage of the copolymeric component may be sulfonamide (by substituting a disulfonyl halide for a minor proportion of diacyl halide), ester (by substituting a glycol for a minor proportion of diamine), urethane (by sustituting a bischloroformate for a minor proportion of diacyl halide) or urea (by substituting phosgene for a minor proportion of acyl halide).

The polymers of the present invention are particularly useful in the preparation of synthetic fibers, films, papers to be used where outstanding resistance to heat, ionizing-radiation, and sunlight are required. The improved solubility of these polymers facilitates fabrication of shaped articles without material sacrifice in the outstanding properties of wholly-aromatic polymers in general. This is of particular value in the case of polymers derived from bi-aryl diacid halides or diamines, which yield shaped structures of greatly improved recovery properties, but which, without the ring-substitution of this invention, are frequently so intractable in ordinary solvents as to be of limited utility. The improved solubility of the polymers prepared from substituted mono-aryl diacid halides or diamines contributes materially to efficiency in shaping and thereby to lower cost of manufacture.

Many equivalent modifications of the above will be apparent to those skilled in the art from a reading of the above without a departure from the inventive concept.

What is claimed is:

1. A linear fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

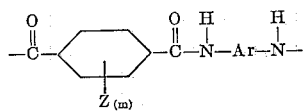

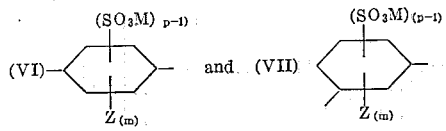

wherein:

Ar is a divalent radical from the class consisting of

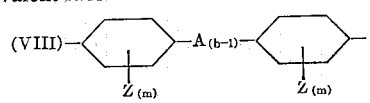

B is a divalent radical of the formula

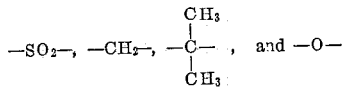

and wherein:
the hexagon represents the benezene nucleus,
M is hydrogen or a neutralizing cation,
$p$ is a number of from one to two inclusive;
Z is a monovalent radical replacement for hydrogen on nuclear carbon from the class consisting of —F and —Cl;
$m$ is a number from 0 to 3, there being at least one $m$ equal to at least 1 in each recurring unit;
A is a divalent radical from the class consisting of $$-SO_2-,\ -CH_2-,\ -\underset{\underset{CH_3}{|}}{\overset{\overset{CH_3}{|}}{C}}-,\ \text{and} -O-$$

and $b$ is a number from one to two inclusive;
other copolymeric units whenever present constituting no more than 10% of the recurring polycarbonamide units, the said polycarbonamide having a melting point of at least about 300° C. and an inherent viscosity of at least about 0.6 in sulfuric acid at 30° C. at a concentration of 0.5 gram of polymer per 100 cc. of solution.

2. A high molecular weight polymer consisting essentially of recurring units of the formula

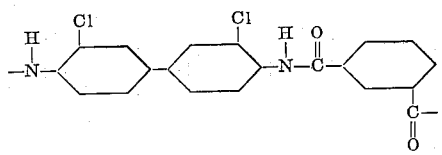

wherein the hexagon represents the benzene nucleus.

3. A high molecular weight polymer consisting essentially of recurring units of the formula

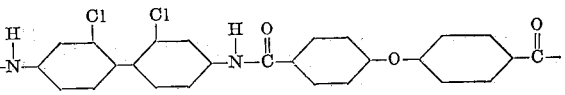

wherein the hexagon represents the benzene nucleus.

4. A high molecular weight polymer consisting essentially of recurring units of the formula

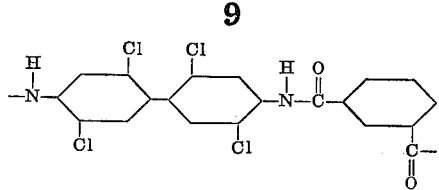

wherein the hexagon represents the benzene nucleus.

5. A high molecular weight copolymer consisting essentially of recurring units of the formulae

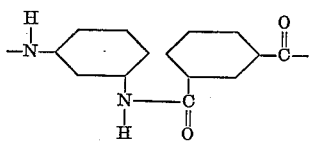

and

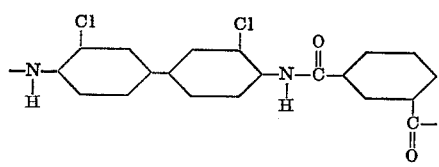

wherein the hexagon represents the benzene nucleus.

6. A high molecular weight terpolymer consisting essentially of recurring units of the formulae

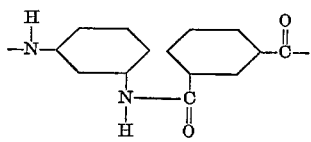

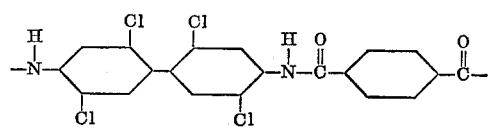

and,

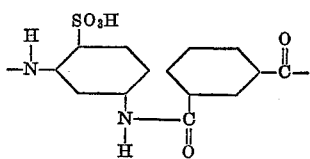

wherein the hexagon represents the benzene nucleus.

7. A high molecular weight polymer consisting essentially of recurring units of the formula

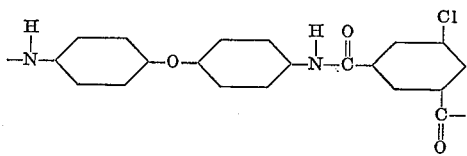

wherein the hexagon represents the benzene nucleus.

8. A high molecular weight polymer consisting essentially of recurring units of the formula

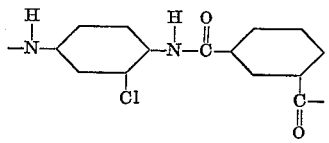

wherein the hexagon represents the benzene nucleus.

References Cited

UNITED STATES PATENTS

| | | | |
|---|---|---|---|
| 2,244,192 | 6/1941 | Flory | 260—78 |
| 2,252,554 | 8/1941 | Carothers | 260—78 |
| 2,277,125 | 3/1942 | Martin | 260—78 |
| 2,621,168 | 12/1952 | Ross et al. | 260—78 |
| 2,625,536 | 1/1953 | Kirby | 260—78 |
| 2,756,221 | 7/1956 | Caldwell | 260—78 |
| 2,766,222 | 10/1956 | Lum et al. | 260—78 |
| 2,831,834 | 4/1958 | Magat | 260—78 |
| 3,049,518 | 8/1962 | Stephens | 260—78 |
| 3,094,511 | 6/1963 | Hill et al. | 260—78 |
| 3,194,794 | 7/1965 | Caldwell et al. | 260—78 |
| 3,206,438 | 9/1965 | Jamison | 260—78 |

FOREIGN PATENTS

| | | |
|---|---|---|
| 1,112,203 | 11/1955 | France. |
| 745,029 | 2/1944 | Germany. |
| 614,625 | 12/1948 | Great Britain. |
| 632,997 | 12/1949 | Great Britain. |

WILLIAM H. SHORT, *Primary Examiner.*

H. D. ANDERSON, *Assistant Examiner.*